United States Patent Office 3,426,546
Patented Feb. 11, 1969

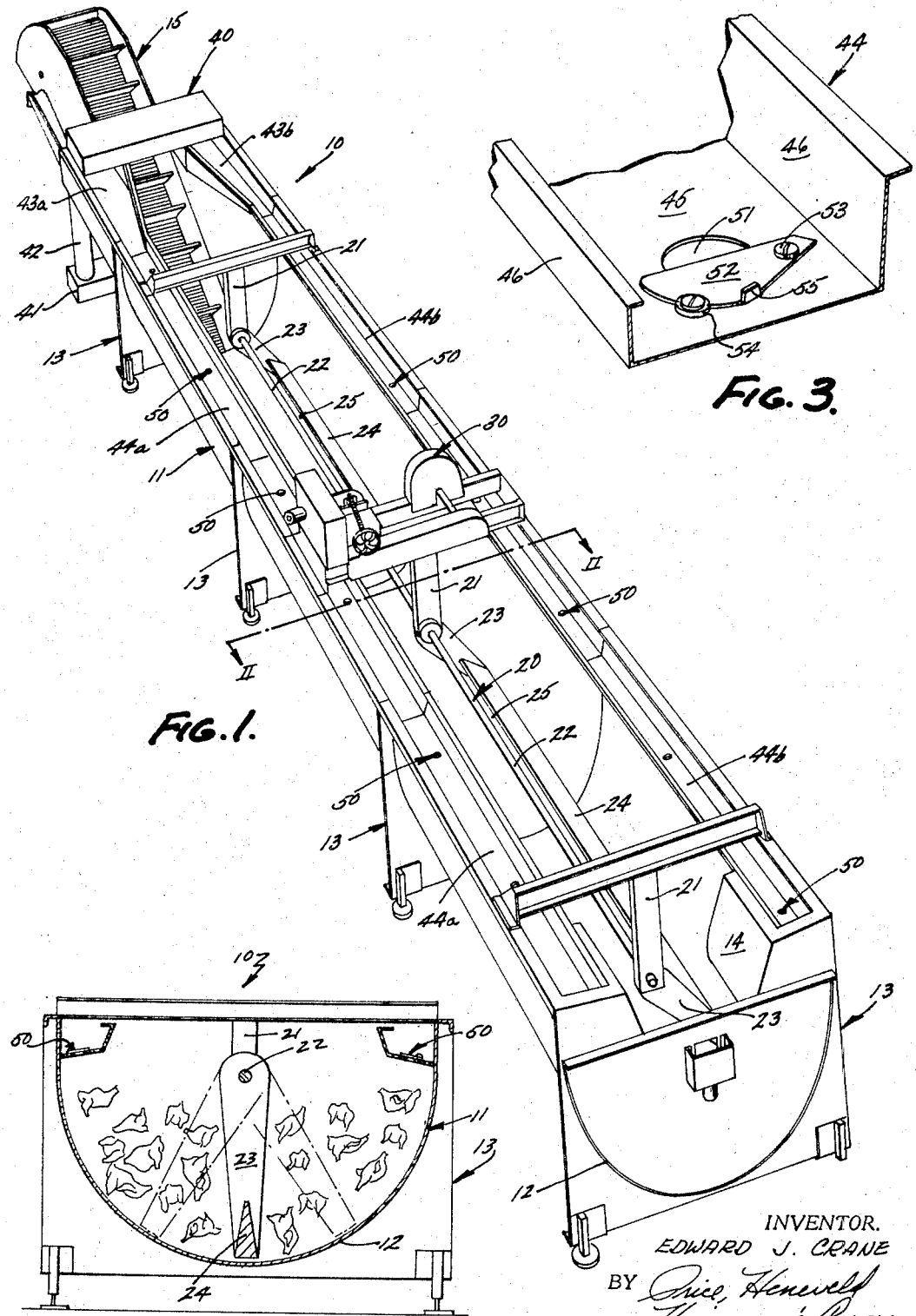

3,426,546
HEAT EXCHANGE TANK
Edward J. Crane, Ottumwa, Iowa, assignor to International Agri Systems, Inc., Ottumwa, Iowa, a corporation of Iowa
Filed Aug. 23, 1967, Ser. No. 662,718
U.S. Cl. 62—63             8 Claims
Int. Cl. F25d *13/06, 13/04;* F25 *17/02*

ABSTRACT OF THE DISCLOSURE

A heat exchange apparatus having an elongated tank adapted to be filled with circulating heat-exchange fluid. An oscillating paddle structure is provided within the tank to agitate the articles (poultry in the preferred embodiment) as they pass through the tank. The heat exchange liquid is recirculated through the tank by withdrawing it at one extremity, treating it to raise or lower its temperature and then discharging it by way of a series of flumes into the opposite extremity of the tank. The flumes are provided with adjustable discharge ports at spaced locations along their complete lengths whereby the heat-exchange fluid may be reintroduced into the tank at any specified section thereof and at any desired rate. This permits different sections of the tank to be maintained at different temperature levels.

Background

This invention relates to a heat-exchange tank and, more particularly, to a tank particularly adapted for the cooling of poultry and other edible items during the preparation thereof for market.

In the preparation of edibles such as poultry, it is often desirable to cool them at some point in the processing program so their temperatures may be brought to a level suitable for further processing steps such as packaging, freezing or the like. This cooling is generally accomplished in some type of tank having a heat-exchange liquid therein through which the articles are passed during the proper production step. It has been found, particularly in the poultry processing industry, that the articles are best cooled by subjecting them initially to a coolant or heat-exchange liquid which is warmer—i.e. tap water temperature—than the temperature which they are desired to reach eventually. Such subjection causes the birds or other articles to absorb a certain amount of the heat-exchange fluid, usually water, and this absorption results in a more uniform and commercially desirable product. Thus, it has become customary in the poultry processing industry to provide a series of two or more individual tanks successively placed along the processing line. The first of these tanks, for example, might contain water at tap temperature and the second, also by way of example, might contain water which has been brought as nearly to the freezing point as possible through the introduction of ice or the like. On such processing lines, the birds are placed initially into the warmer heat exchange tank and migrate therethrough absorbing water as desired and thereafter transferred to the colder heat exchange tank to bring their temperatures down to the desired level.

The necessity of providing two or more separate heat exchange tanks on processing lines of the type described presents rather obvious disadvantages. Initially, of course, two completely separate tank structures must be provided in order to keep the heat-exchange liquids from mingling. Additionally, separate drive means for the agitation apparatus within the individual tanks are usually provided. Further, separate and somewhat redundant mechanisms must be provided for introducing the birds into each of the tanks and extracting them therefrom. Also, of course, separate means must be provided for recirculating the fluid with each of the tanks.

Objects and specification

It is an object of this invention, therefore, to provide a heat-exchange tank suitable for utilization in the processing of edible products which is not subject to the disadvantages outlined above.

More particularly, it is an object of this invention to provide such an apparatus wherein a single tank structure may be divided into any suitable number of sections without the necessity of providing a physical metallic barrier or the like between sections and, therefore, in which the birds may migrate from section to section of the tank and, thus, be subjected to heat exchange fluid of varying temperatures without the necessity of extracting them from and reintroducing them into successive tanks along the processing line.

Thus, it is an object of this invention to provide an apparatus of the type described which reduces markedly the capital investment necessary for the chilling of edible products.

It is an object of this invention to provide a device of the type described wherein a single agitator driving system and recirculation system including pumps and the like may be utilized for the entire cooling operation.

It is yet another object of this invention to provide a device of the type described embodying, in combination, a novel agitation system capable of efficiently and thoroughly exposing all portions of the edible products to the heat-exchange fluid within the various sections of the tank and propelling the articles through the device at such a rate as to insure a uniform, commercially acceptable product.

These as well as other objects of this invention will be readily understood with reference to the following specification and accompanying figures in which:

FIG. 1 is a perspective view of the novel heat-exchange tank;

FIG. 2 is a cross-sectional view taken along plane II—II of FIG. 1; and

FIG. 3 is a fragmentary, perspective view of the flume and adjustable discharge port assembly.

Briefly, this invention comprises a heat-exchange apparatus having an elongated tank adapted to be filled with heat exchange fluid such as water. Means are provided for withdrawing the fluid near one extremity of the tank and transferring at least a portion thereof to a location in the tank near the opposite extremity thereof for recirculation. Means are provided in association with the transfer means for discharging at least a portion of the withdrawing fluid into the tank intermediate the extremities thereof during the transferring process whereby the temperatures of the fluid in different sections of the tank may be maintained at different levels.

Referring now to the figures, a preferred embodiment of this invention will be described in detail. The heat-exchange apparatus, indicated generally throughout the figures by the reference numeral 10, comprises an elongated tank 11 having a curved cross-sectional contour 12 at the lower portion thereof. The tank is supported on the floor of the particular processing installation by means of a plurality of upright supports indicated generally by the reference numeral 13. This tank has an input end 14 and an output elevator 15 at the opposite extremity thereof.

Positioned within the elongated tank 11 is a paddle assembly 20. Paddle assembly 20 comprises a plurality of depending supports 21 which extend into the tank and are structurally associated therewith in conventional fashion. The depending supports 21 carry a pivotably jornalled, elongated shaft 22 having a plurality of paddle supporting arms 23 extending downwardly therefrom.

The paddle supporting arms 23 carry an elongated paddle 24 spaced from the shaft as indicated at 25 to permit birds to pass between the shaft and paddle during oscillation thereof.

The paddle is driven by a paddle drive assembly 30. Paddle drive assembly 30, in any conventional fashion, causes the shaft 22 and, thus, the paddle 24 carried thereby to oscillate through an arc approximately equal to that indicated by the phantom lines in FIG. 2. The space 25 between the shaft 22 and paddle permit the passage of birds therebetween during oscillation of the paddle and, thus, prevent the birds from being bruised or the like by the paddle.

The recirculation asembly, indicated generally by the reference numeral 40, comprises a collection chamber 41 having lift pipes 42 affixed in communicating relationship with respect thereto. The coolant or heat exchange fluid flows from the elevator extremity of the tank into the collection chamber 41, is lifted by suitable pumping means in the standpipes 42 and flows into the spillways 43a and 43b. The fluid migrates under the influence of gravity along the flumes 44 toward the opposite or entry extremity of the tank. Each of the flumes, as shown best in FIG. 3, comprises a base 45 and sidewalls 46.

That portion of the apparatus which has been described to this point is virtually identical to the apparatus described and claimed in co-pending application Ser. No. 627,123, filed Mar. 30, 1967, and assigned to the same assignee as the instant invention, Reference is made to this co-pending application for a more detailed description of the characteristics of the tank, paddle assembly, drive assembly and recirculation assembly.

The salutory feature of this invention is the positioning of a number of discharge ports along the length of each of the flumes 44a and 44b to permit selective re-entry of the coolant fluid into the tank at various positions along its length. By way of background, and as discussed in detail in the co-pending application noted above, during the recirculation process ice is usually loaded into the apparatus at the spillways 43a and 43b in order to bring the coolant fluid to the desired temperature. Thus, the water or other fluid flowing in the spillways differs markedly in temperature with the water within the tank, particularly near the elevator extremity thereof since the fluid tends to warm via the absorption of heat from the edible particles being cooled as it migrates through the tank from the entry end 14 thereof to the elevatory extremity 15 thereof.

As illustrated best in FIGS. 2 and 3, the indications of the discharge ports 50 in FIG. 1 being schematic only, each of the discharge port assemblies 50 comprises an aperture 51 formed in the base 45 of the elongated flumes 44a and 44b. A pivoted cover plate 52, pivoted by means of a bolt, screw or the like 53 is positioned within the flume such that it may be selectively moved to cover all or a portion of the aperture 51 and, thus, control the amount of coolant fluid discharged therefrom at that particular location. Conveniently, as illustrated, a retainer structure 54 is provided for insuring that the cover plate 52 will stay flush with respect to the base 45 of the flume 44. Conveniently, additionally, the plate 52 may be provided with a raised portion or handle 55 to assist in its adjustment.

By adjusting the individual discharge ports 50, the amount of low-temperature coolant introduced into the tank at various sections thereof may be controlled and, thus, effectively isolated sections of the tank may be maintained at different temperatures. Thus, by permitting most of the cooled heat-exchange fluid to enter the tank prior to its travel to the entry end 14 thereof in the flumes 44, the coolant in the entry extremity 14 of the tank may be kept at a higher temperature than the fluid in progressive sections of the tank. Such temperature control permits, as pointed out previously in the introduction, the edible articles such as poultry or the like to be subjected initially to a relatively warm coolant which is readily absorbed by the birds as is desirable. As the birds migrate, thereafter, through the tank toward the elevator extremity 15 thereof, they may pass into successively cooler regions of the tank until, at the point of their extraction, they are at the desired temperature.

Depending upon the particular adjustments of the ports 15, there may exist, in reality, a slight amount of "backflow" within the tank 11—i.e. movement of water toward the entry end of the tank from the intermediate ports 50. Such movement of the coolant does not hamper the movement of the article through the tank, however, because of the constant agitation imparted to them by the agitation system 20 and because of the relatively constant introduction of articles into the entry extremity 14 of the apparatus.

By empirically adjusting the ports in any given environment, a result identical to that obtainable with two individual tanks may be achieved. The savings in equipment investment thus realized, particularly on smaller processing lines, and the attendant advantages, will be evident.

While a preferred embodiment of this invention has been illustrated in detail, it will be readily apparent to those skilled in the art that other embodiments may be conceived and fabricated without departing from the spirit of this specification and the accompanying drawings. Such other embodiments are to be deemed as included within the scope of the following claims unless these claims, by their language, expressingly state otherwise.

I claim:

1. A method of cooling poultry during the processing thereof within a single tank containing heat exchange liquid wherein the poultry are introduced into the tank near one extremity thereof, caused to migrate along said tank and removed from the tank near the other extremity theerof, said method having the steps of:

creating zones along the length of said tank which contain liquid of different temperatures by introducing into said tank varying quantities of cooled liquid at various points along the length thereof;

maintaining those zones adjacent said one extremity at a temperature which is warmer than those zones adjacent the said other extremity by controlling the quantities of cooled liquid introduced thereat whereby said poultry will be subjected first upon introduction into said tank to contact with fluid which is warm relative to the temperature of the fluid to which said poultry are subjected to contact with prior to their removal from the tank.

2. The method as set forth in claim 1 which further comprises the step of agitating said poultry as they pass through said tank.

3. The method as set forth in claim 2 which further comprises the steps of withdrawing liquid from said tank at the said other extremity thereof; cooling at least some of said withdrawn liquid to a lower temperature; and reintroducing the cooled withdrawn liquid into said tank at said various points.

4. In a heat-exchange apparatus adapted particularly for chilling edible animal carcasses having an elongated tank adapted to be filled with heat-exchange fluid; means for withdrawing said fluid near one extremity of said tank and transferring and discharging at least a portion thereof to a location in said tank near the opposite extremity thereof for recirculation therethrough; means for varying the temperature of said fluid as it is transferred; an elongated paddle positioned within said tank and means for oscillating said paddle in said tank in a path conforming generally to a section of the lower cross-sectional contour thereof; the improvement comprising: means associated with said transfer means for discharging at least a portion of said withdrawn fluid into said tank intermediate the extremities thereof during transfer of said fluid whereby the temperatures of the fluid in different sections of said tank may be maintained at different levels.

5. The apparatus as set forth in claim 4 wherein said discharging means are adjustable.

6. The apparatus as set forth in claim 5 wherein said transferring means comprises at least one elongated flume communicating between opposite extremities of said tank along which said fluid is adapted to flow under the influence of gravity and wherein said discharging means comprises at least one adjustable part along the length of said flume intermediate the extremities thereof.

7. The apparatus as set forth in claim 6 wherein two such flumes are provided, one of said flumes running along either side of said tank, each of said flumes having at least two of said ports intermediate the extremities thereof.

8. The apparatus as set forth in claim 6 which further comprises means for discharging articles from one extremity of said tank and means for pumping said heat exchange fluid from said one extremity of said tank into said flume.

References Cited

UNITED STATES PATENTS

| | | | |
|---|---|---|---|
| 1,964,276 | 6/1934 | Skinner | 62—375 |
| 2,347,642 | 5/1944 | Reinhardt | 62—376 |
| 2,920,462 | 1/1960 | Roser et al. | 62—376 X |
| 3,340,696 | 9/1967 | Zebarth et al. | 62—64 X |

ROBERT A. O'LEARY, *Primary Examiner.*

ALBERT W. DAVIS, JR., *Assistant Examiner.*

U.S. Cl. X.R.

62—65, 375